Patented Oct. 12, 1948

2,451,435

UNITED STATES PATENT OFFICE 2,451,435

PLASTIC COMPOSITIONS AND PROCESS OF MAKING THE SAME FROM AN UNSATURATED KETONE AND AN UNSATURATED NITRILE

William E. Elwell and Richard L. Meier, Berkeley, Calif., assignors to California Research Corporation, San Francisco, Calif., a corporation of Delaware No Drawing. Application June 11, 1945, Serial No. 598,904

11 Claims. (Cl. 260—63)

The invention relates to new compositions of matter and more particularly to copolymers of certain unsaturated ketones and unsaturated nitriles.

With respect to polymerization, vinyl ketones and vinyl nitriles have widely different characteristics. The carbonyl group $>C=O$ and the nitrile group $-C\equiv N$ are distinctly dissimilar, and this characteristic dissimilarity is imparted to the vinyl compounds containing them. Whether or not such dissimilar compounds will co-act under polymerization conditions is entirely unpredictable. Likewise, important physical properties desirable in copolymer products remain the subject of empirical and exploratory research, since such properties cannot be predicted in advance of actual tests.

Thus, when a mixture of two dissimilar vinyl monomers is subjected to conditions of polymerization, for instance, in the presence of benzoyl peroxide catalyst or under the effect of ultraviolet light, either (or both) of the given type monomers present in such a mixture may preferably react with itself and yield only a predominance of its own polymer in the final product, or an unsatisfactory mixture of two dissimilar polymers. Even if copolymerization occurs, it cannot be foreseen under what conditions satisfactory products will be obtained or whether superior products can be produced under conditions of any kind. To illustrate specifically: a mixture of styrene and vinyl acetate does not yield copolymers, but gives, so far as known, exclusively a mechanical mixture of polystyrene and polyvinyl acetate under any polymerizing conditions.

A large number of physical properties of copolymers cannot be predicted. Among such unpredictable properties may be mentioned solubility, brittle point, softening point, modulus of elasticity, hardness, etc. In general, most of those properties which determine the amenability of copolymer compositions to molding or other form of shaping cannot be predicted and are ascertained only by actual tests of copolymer materials.

These difficulties of being unable to predict both the conditions for copolymerization and production of a homogeneous clear resin and the unpredictability of either the composition or the physical properties of copolymers are present in the polymerization of mixtures of vinyl ketones and vinyl nitriles.

The principal object of the present invention is to provide new and valuable copolymers containing ketone groups and nitrile groups in the same molecule and possessing a number of novel and valuable properties heretofore unobtainable in the polymers of either pure vinyl ketones or pure vinyl nitriles.

Another object is to provide synthetic, resinous, thermoplastic, homogeneous materials, resistant to heat, water, greases, oils, gasoline, petroleum hydrocarbons in general and some other solvents of synthetic resins by copolymerizing a vinyl ketone monomer and a vinyl nitrile.

Still another object of the invention is to provide homogeneous copolymers of vinyl ketones and vinyl nitriles, which are free of incompatible polymers, and, consequently, are clear and not cloudy, and which possess good tensile strength, have little tendency to cold flow and are easily extruded, molded or otherwise shaped.

Other objects of the invention will become apparent from the following specification.

The aforementioned objects are accomplished by copolymerizing a vinyl ketone monomer with a vinyl nitrile monomer, as hereinafter disclosed, so as to produce a homogeneous copolymer having an average molecular weight in the range of 5,000 to 100,000.

It has been discovered that in the copolymerization of vinyl ketones and vinyl nitriles a greater proportion of the vinyl ketone monomer enters the polymeric molecule during chain propagation, as compared with the corresponding proportion of the vinyl nitrile component of the reaction mixture. For example, a mol to mol mixture of a vinyl ketone and a vinyl nitrile at first yields copolymers containing a high proportion of vinyl ketone. The concentration of vinyl ketone in the monomer mixture decreases as the copolymerization goes on, the proportion of vinyl nitrile in the copolymer becoming greater. When the vinyl nitrile content of the copolymer exceeds a certain critical value which depends on the particular species of the monomers used and the conditions of polymerization, the copolymer then formed becomes insoluble in the mixture of monomers, and a new phase forms sometime before the polymerization is completed. Should the reaction be carried to completion with more than a certain maximum concentration of the vinyl nitrile constituent present in the initial mixture of monomers, the resulting product will be a nonhomogeneous, cloudy and milky mixture and will contain two phases of different density, insoluble and incompatible with each other. Materials molded from such a product have low impact and tensile strengths, and are otherwise relatively undesirable because of their being nonhomogeneous and lacking transparency.

According to the present invention, a normally solid, homogeneous, clear copolymer of a vinyl ketone and a vinyl nitrile is produced by copolymerizing a mixture of vinyl ketone and vinyl nitrile monomers, the initial concentration of the vinyl nitrile constituent in the monomer mixture being less than a certain maximum value which is determined by the particular species of the monomers used. If this maximum concentration is exceeded, nonhomogeneous copolymers will result. Likewise, the type of copolymer obtained is dependent on the particular technique and the kind of catalyst adopted. For instance, in the case of methyl vinyl ketone and acrylonitrile, subjected to copolymerization at 50° C. in the presence of 0.5% by weight of benzoyl peroxide, the critical concentration of the nitrile constituent in the monomer mixture is equal to between about 40 to about 45% by weight, corresponding to about 35 to 40% by weight of acrylonitrile in the copolymer. When copolymerizing a mixture of the same monomers in ultra-violet light, this critical concentration of the acrylonitrile constituent is comprised between about 65 to about 70% by weight.

On the other hand, it has been discovered that when homogeneous copolymers of a higher vinyl nitrile content, e. g. copolymers of methyl vinyl ketone and acrylonitrile, containing from about 40 to about 70% by weight of acrylonitrile, are desired to be produced, a mixture of monomers containing a high proportion of vinyl nitrile must be used, in which the vinyl nitrile concentration is maintained within a range, which would permit of avoiding the formation of non-homogeneous, incompatible polymers by the use of certain special procedures hereinafter described.

One such procedure consists in polymerizing the mixture of monomers to a stage just preceding the aforementioned separation of phases. At this stage the reaction is stopped, the polymers and the unreacted monomers are withdrawn from the reaction zone, the unreacted monomers separated by distillation or extraction and reintroduced into the polymerization zone after their concentrations have been readjusted to the initial ratio, whereupon the polymerization is continued.

Another method consists in similarly polymerizing the mixture of monomers to a stage just preceding the separation of two phases, and then maintaining the ratio of monomer concentrations constant by continuously withdrawing the resulting polymer and continuously supplying to the reaction zone the corresponding monomers at the rate each of them is being exhausted.

These copolymers of the invention rich in vinyl nitrile are completely homogeneous. They represent hard, tough to brittle, transparent, colorless to yellow resins, generally insoluble in ester and ketone solvents.

As initial materials for the production of the copolymers of the present invention, monomers of methyl isopropenyl ketone or vinyl ketones, e. g. methyl vinyl ketone, ethyl vinyl ketone, propyl vinyl ketone, ispropyl vinyl ketone, butyl vinyl ketone, isobutyl vinyl ketone, phenyl vinyl ketone and the like may be used. Acrylonitrile and methacrylonitrile may be employed as the second constituent of the copolymers of the invention.

In general, the use of higher alkyl vinyl ketones requires a reduction of the maximum content in vinyl nitrile, such as acrylonitrile, in order to obtain a homogeneous copolymer. Likewise, if methacrylonitrile is used in place of acrylonitrile, the maximum amount of methacrylonitrile which would still yield a homogeneous product is lower than the corresponding amount of acrylonitrile.

Polymers of acrylonitrile and methacrylonitrile, have been produced in the past. However, these polymers prepared by the conventional methods of the art are brittle, hard and opaque, and, consequently, are unsuitable for molding purposes. Furthermore, they are insoluble in ordinary lacquer solvents and difficult to polymerize.

On the other hand, vinyl ketone polymers such as polymers of alkyl and aryl vinyl ketones have been prepared. They are transparent and fairly elastic, but possess a number of disadvantages. Their softening points are generally not very much higher than room temperature, the values being dependent on the nature of the alkyl or the aryl groups in the polymer. Consequently, they are unsuitable for many purposes where toughness is desired, or in those applications where resistance to relatively high temperatures is required, and, while relatively moldable, they adhere to the mold and are difficult to remove therefrom. Moreover, practically all of the vinyl ketone polymers are subject to cold flow at temperatures about 10 to 20° C. above room temperature.

On comparing the properties of pure vinyl nitrile and pure vinyl ketone polymers with those of the copolymers of the present invention and on considering the results of the copolymerization, the remarkable features of the invention become evident. First, it is discovered that homogenous copolymers of high nitrile content can be obtained only by maintaining a certain minimum concentration ratio of the monomers in the mixture, determinable by actual experiment for each combination of vinyl nitrile and vinyl ketone monomers and by the particular technique of polymerization. Secondly, copolymers of low vinyl nitrile content of excellent mechanical properties, much less readily adhering to glass and metal than the pure polymers of methyl vinyl ketone and, therefore, suitable for molding, milling, casting and extruding and having little tendency to cold flow, are produced by using from about 60 to about 90% by weight of a vinyl ketone in the reaction mixture. Thirdly, flexible copolymers possessing good elastic properties may be obtained by keeping the vinyl nitrile content in the copolymer at about 10% by weight.

Copolymers of the present invention are illustrated by the following moleculuar formula:

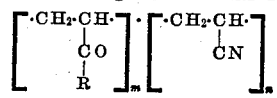

where R may be an alkyl or an aromatic radical and $m$ and $n$ are integers.

Whether of low vinyl nitrile or high vinyl nitrile content, the copolymers of the present invention are soluble in 2-nitropropane.

These copolymers are insoluble in water, alcohols, aromatic hydrocarbons, e. g. benzene and xylenes, petroleum hydrocarbons, gasoline, oils, greases. Copolymers of low vinyl nitrile content, for example those containing from about 5 to about 40% by weight of acrylonitrile and from about 95 to about 60% by weight of methyl vinyl ketone, are soluble in halogenated hydrocarbons, such as chloroform, in ketone solvents, such as acetone, methyl ethyl ketone, etc., in ester solvents, such as methyl propionate, butyl acetate and the like. The same copolymers of low vinyl nitrile content are readily plasticized by the common plasticizers for vinyl polymers, e. g. phthalate and phosphate esters, camphor, etc.

Contrariwise, copolymers of high vinyl nitrile content, for example those containing from about 40 to about 70% by weight of acrylonitrile and from about 60 to about 30% by weight of methyl vinyl ketone, are insoluble in ketone and ester solvents, or practically so, and can be plasticized with phthalate and phosphate esters but to a very limited extent, and then only those copolymers which contain lower amounts of vinyl nitrile in the 40 to 70% acrylonitrile content range.

In general, copolymers of vinyl nitrile and vinyl ketones, prepared in accordance with this invention, whether of low or of high vinyl nitrile content, are homogeneous, thermoplastic, transparent resins, colorless to yellow-orange in tint. Lighter colors are obtainable by resorting to ultra-violet light in preference to the use of peroxide catalysts. The brittle points and softening points of these copolymers depend on the molecular weight and improve with the increase of the vinyl nitrile content. Water absorption of these products decreases notably with the increasing vinyl nitrile content. They are resistant to moisture, react with ammonia, but remain insoluble therein, and do not materially depreciate with age.

The mechanical properties possessed by the copolymers of this invention are particularly valuable: they vary from tough, flexible solids with elastic memory in the range of about 5% to about 15% by weight of vinyl nitrile, through hard, tough, non-brittle, horn-like materials, readily recoverable from the mold in the range of about 15% to about 40% by weight of vinyl nitrile, to from shock-resistant, tough to hard, glass-like solids in the range from about 40% to about 70% by weight of vinyl nitrile. The rate of cold flow decreases with the increasing vinyl nitrile content. Because of the higher softening points, as compared with the pure polymers of vinyl ketones, non-brittleness and lack of excessive adhesion to glass and metal, the moldability of these copolymers is excellent and makes them suitable for a variety of uses. Articles and materials made from these copolymers are shatter-proof, puncture-proof and tough.

The following examples are given to illustrate the invention and to emphasize the difficulties from the formation of nonhomogeneous products, heretofore unrecognized or unsolved by the art, and the effect of various operating techniques and composition ratios on the properties of the copolymeric materials.

*Example 1*

This example serves to prove the fact of copolymerization of a vinyl ketone and a vinyl nitrile in accordance with the foregoing principles of the invention and also illustrates the formation of a homogeneous, thermoplastic copolymer of methyl vinyl ketone and acrylonitrile of low acrylonitrile content, readily moldable and recoverable from the mold.

65 parts by weight of methyl vinyl ketone and 35 parts by weight of acrylonitrile are placed into a reaction tube together with 1 part by weight of benzoyl peroxide and subjected to copolymerization at 100° C. in a steam bath for 16 hours. The resulting product is a viscous, orange-yellow liquid. It is dissolved in chloroform and poured into a large volume of isopentane, whereupon, after evaporation of chloroform and isopentane, a final product is obtained as a hard, clear, transparent, horn-like, orange resin. Polymers of pure acrylonitrile are insoluble in chloroform; therefore, the ready dissolution in chloroform of the crude reaction product proved the formation of a copolymer of acrylonitrile and methyl vinyl ketone. The nitrogen analysis of the product gives a value of 7.4% by weight of nitrogen (28% by weight of acrylonitrile), which result corroborates the above conclusion. If a polymer of pure acrylonitrile were present, its nitrogen analysis would yield a value of 26.4% by weight of nitrogen. The molecular weight of the copolymer of the present example, as calculated on the basis of intrinsic viscosity, lies in the range of 5,000 to 10,000. The final product is thermoplastic, does not adhere excessively to glass or metal and can be readily removed from the mold after molding treatment.

*Example 2*

This example shows the formation of homogeneous resins of low vinyl nitrile content by using the ultra-violet light technique.

85 parts by weight of methyl vinyl ketone and 15 parts by weight of acrylonitrile are sealed off in a reaction tube and subjected to a copolymerization in sunlight for 7 days. The copolymerization product is a tough but flexible, clear, transparent, colorless resin with slight yellow tint. Its molecular weight lies in the range of 25,000 to 100,000, as calculated on the basis of intrinsic viscosity. It is to be noted that a much lighter, practically colorless product is obtained in this example by using ultra-violet light to induce copolymerization as contrasted with the much darker colored, yellow-orange resins obtained with the aid of peroxide catalysts. This improvement of color is quite remarkable.

*Example 3*

This is given to illustrate the formation of flexible copolymers of low vinyl nitrile content, displaying elastic memory.

90 parts by weight of methyl vinyl ketone, 10 parts by weight of acrylonitrile and 1 part by weight of benzoyl peroxide are charged into a reaction tube and subjected to copolymerization at about 43° C. for 48 hours. The final reaction product is a clear, colorless to yellow, tough but flexible resin, displaying elastic memory. It stiffens upon aging. Its molecular weight lies in the range of 25,000 to 100,000, as calculated on the basis of intrinsic viscosity.

*Example 4*

This example is included to illustrate the production of copolymers of ethyl vinyl ketone and acrylonitrile.

75 parts by weight of ethyl vinyl ketone and 25 parts by weight of acrylonitrile are sealed off in a glass tube and exposed overnight to the effect of ultra-violet light at about 60° C. The product is a somewhat elastic, clear, transparent resin, soluble in chloroform, methyl acetate and nitroparaffins.

*Example 5*

This example illustrates a polymerization process with initial vinyl nitrile content of the monomer mixture at the range where nonhomogeneous product are obtained.

55 parts by weight of methyl vinyl ketone, 45 parts by weight of acrylonitrile and 1 part by weight of benzoyl peroxide are copolymerized to a hard mass at 60° C. for less than about 15 hours. When the reaction is carried out to completion, a small amount of hard, yellow, incompatible resin separates from the resinous copolymer as an entirely distinct, different phase. Only about 10% of the entire reaction product is soluble in methyl ethyl ketone. However, the whole is soluble in 2-nitropropane.

Example 6

In this example, the formation of homogeneous copolymers of low vinyl nitrile content is shown, the initial amount of vinyl nitrile monomer being just below the critical one, as contrasted with Example 5 above.

60 parts by weight of methyl vinyl ketone, 40 parts by weight of acrylonitrile and ½ part by weight of benzoyl peroxide are charged into a glass bomb which is sealed off and heated overnight in an oven maintained at 50° C. A very viscous, yellow-orange, resinous mass is obtained. It is dissolved in 300 parts of methyl ethyl ketone and poured into 1,000 parts of isopentane, whereupon a rubbery precipitate is formed. This precipitate is collected and dried in a vacuum dessicator at 50° C. for 2 days in order to remove both the solvent and the anti-solvent. The next yield of this semi-brittle, yellow froth is 53%. The nitrogen analysis (Dumas) gives a nitrogen content value of 8.8% which corresponds to an acrylonitrile content of 23% by weight.

Example 7

It is shown in this example that homogeneous copolymers of higher vinyl nitrile content may be obtained by using the ultra-violet light technique as compared with the use of peroxide catalysts, and that lighter colored products are obtainable thereby.

40 parts by weight of methyl vinyl ketone and 60 parts by weight of acrylonitrile are charged into a glass tube, sealed off and exposed to the action of ultra-violet light at about 55° C. for 16 hours. The mixture becomes completely polymerized, and the product consists of a homogeneous, hard, non-brittle, clear, transparent resin with a light yellow tint.

Example 8

This example further proves the formation of non-homogeneous products avoidable only by the present invention, e. g. by adding methyl vinyl ketone to increase the ratio of its concentration to that of acrylonitrile in the monomer mixture, before an incompatible polymer is formed.

40 parts by weight of methyl vinyl ketone, 60 parts by weight of acryonitrile and ½ part by weight of benzoyl peroxide are charged into a glass bomb, which is then sealed off and heated overnight in an oven maintained at 50° C. The reaction product is found to consist of two incompletely separated layers, the upper one of which has a somewhat lighter color and is less viscous, while the lower one is cloudy in appearance. The copolymerizate is dissolved in 300 parts of 2-nitropropane and poured into methanol, whereupon a rubbery precipitate results. It is collected and dried for 7 days in a vacuum dessicator at 50° C. An orange-brown, non-homogeneous product is obtained from the precipitate in a total yield of 53%. It possesses a low impact strength and a low tensile strength and is only slightly swelled by methyl ethyl ketone or ethyl acetate.

Example 9

This last example illustrates the invention as applied to producing homogeneous, thermoplastic resins by controlling the concentration ratio of the monomers in the mixture.

40 parts by weight of methyl vinyl ketone, 60 parts by weight of acrylonitrile and ½ part by weight of benzoyl peroxide are charged into a glass bomb and polymerized until about 15% by weight of the polymer is obtained, as determined by taking small samples while polymerization progresses. This occurs in about 20–50 minutes. Thereafter, the polymerization is discontinued and the polymer together with the unreacted monomers are removed from the bomb. The monomers are stripped off, either by distillation or extraction, brought back to their initial concentration and the mixture of monomers, readjusted to its initial concentration (40% of methyl vinyl ketone and 60% of acrylonitrile), is reintroduced into the bomb containing the initial amount of catalyst. In this manner homogeneous, compatible, thermoplastic resins of high vinyl nitrile content are obtained; they are insoluble in either ester or ketone solvents, but dissolve in 2-nitropropane.

In view of their resistance to moisture, petroleum hydrocarbons, oils, gasoline and greases, packing glands, gaskets, electric insulation and other materials manufactured from the copolymers of the present invention, are particularly valuable for use in industrial and marine machinery where such materials are generally exposed to the effects of steam, moisture, engine fumes, splattering oil, water and gasoline.

Furthermore, the products of the invention may be used in leather dressing, waterproofing of fabrics, manufacture of sheeting materials, casings and wrappers for foods, and the like. When dissolved in appropriate solvents, copolymers of lower vinyl nitrile content can be satisfactorily used in lacquer coatings, adhesives, textile impregnation and other similar applications. Copolymers containing from about 5 to about 15% by weight, when applied as surface coatings, owing to their exceptional elastic properties, are able to follow the contractions and expansions of the underlying base material, caused by the changes in temperature, without cracking or disruption of the coated surface.

The conditions of copolymerization and the amounts of the initial materials may be correlated, within the limitations previously stated, to suit the requirements of each particular case. For instance, the copolymerization may be carried out not only in the presence of peroxide catalysts, e. g. of benzoyl peroxide, or other suitable and effective catalysts, but also in sunlight and in the absence of any catalysts. Ultra-violet light may also be used for effecting the reaction, as well as other suitable aids for promoting the same. With sunlight or other suitable sources of ultra-violet light relatively higher concentrations of acrylonitrile may be utilized in the monomer mixture. Neither is the amount of the catalyst to be used limited to the amounts given in the above examples, but it may be varied to suit each particular case. The temperature at which the reaction may be carried out is comprised in the range of 20° C. to 120° C. The use of pressure is ordinarily unnecessary, though it may be used, if desired, under the circumstances of a particular case. Likewise, emulsion polymerization methods may be used in place of the conventional bulk polymerization.

While there have been disclosed above certain preferred embodiments of the invention, it will be understood that it is not limited thereby, and that numerous modifications and variations in the process and in the compositions may be made within the scope of the attached claims covering all features of patentable novelty residing in the invention.

We claim:

1. A synthetic resin consisting of a copolymer of a ketone wherein the carbon of the carbonyl radical is directly joined to a radical from the group consisting of vinyl and isopropenyl radicals and to a radical from the group consisting of alkyl and phenyl radicals, said alkyl radical containing from 1 to 4 carbon atoms, with a nitrile from the group consisting of acrylonitrile and methacrylonitrile, said copolymer containing from 60 to 85 per cent by weight of said ketone and from 40 to 15 per cent by weight of said nitrile, and further characterized by being clear, homogeneous, thermoplastic, readily flexible to hard substantially inflexible, and soluble in 2-nitropropane.

2. A synthetic resin consisting of a copolymer of an alykyl vinyl ketone wherein the carbon of the carbonyl radical is directly joined to the vinyl radical and to the alkyl radical, said alkyl radical containing from 1 to 4 carbon atoms, with a nitrile from the group consisting of acrylonitrile and methacrylonitrile, said copolymer containing from 60 to 85 per cent by weight of said alkyl vinyl ketone and from 40 to 15 per cent by weight of said nitrile and further characterized by being clear, homogeneous, thermoplastic, readily flexible to hard substantially inflexible, and soluble in 2-nitropropane.

3. A synthetic resin consisting of a copolymer of an alykyl vinyl ketone wherein the carbon of the carbonyl radical is directly joined to the vinyl radical and to the alkyl radical, said alkyl radical containing from 1 to 4 carbon atoms, with acrylonitrile, said copolymer containing from 60 to 85 per cent by weight of said alkyl vinyl ketone and from 40 to 15 per cent by weight of said acrylonitrile and further characterized by being clear, homogeneous, thermoplastic, readily flexible to hard substantially inflexible, and soluble in 2-nitropropane.

4. A synthetic resin consisting of a copolymer of an alkyl vinyl ketone wherein the carbon of the carbonyl radical is directly joined to the vinyl radical and the alkyl radical, said alkyl radical containing from 1 to 4 carbon atoms, with a nitrile from the group consisting of acrylonitrile and methacrylonitrile, said copolymer containing from 60 to 85 per cent by weight of said alkyl vinyl ketone and from 40 to 15 per cent by weight of said nitrile and further characterized by being clear, homogeneous, thermoplastic, readily flexible to hard substantially inflexible, soluble in 2-nitropropane, and having an average molecular weight of more than 5000.

5. A synthetic resin consisting of a copolymer of methyl vinyl ketone and acrylonitrile, said copolymer containing from 60 to 85 per cent by weight of methyl vinyl ketone and from 40 to 15 per cent by weight of acrylonitrile, and further characterized by being clear, homogeneous, thermoplastic, readily flexible to hard substantially inflexible, and soluble in 2-nitropropane.

6. A process which comprises copolymerizing a mixture of monomers consisting of from 60 to 85 per cent by weight of a ketone wherein the carbon of the carbonyl radical is directly joined to a radical from the group consisting of vinyl and isopropenyl radicals and to a radical from the group consisting of alkyl and phenyl radicals, said alkyl radical containing from 1 to 4 carbon atoms, and from 40 to 15 per cent by weight of a nitrile from the group consisting of acrylonitrile and methacrylonitrile at a temperature from 20° C. to 120° C., and preventing formation of mutually incompatible polymers and copolymers by limiting the relative proportions of nitrile monomer entering the polymerization reaction to prevent formation of a second polymer phase, said nitrile monomer having a slower rate of reaction than the ketone monomer.

7. A process which comprises copolymerizing a mixture of monomers consisting of from 60 per cent to 85 per cent by weight of an alkyl vinyl ketone, wherein the carbon of the carbonyl radical is directly joined to the vinyl radical and the alkyl radical, said alkyl radical containing from 1 to 4 carbon atoms, and from 40 to 15 per cent by weight of a nitrile from the group consisting of acrylonitrile and methacrylonitrile at a temperature from 20° C. to 120° C., and preventing formation of mutually incompatible polymers and copolymers by limiting the relative proportions of nitrile monomer entering the polymerization reaction to prevent formation of a second polymer phase, said nitrile monomer having a slower rate of reaction than the ketone monomer.

8. A process which comprises copolymerizing a mixture of monomers consisting of from 60 to 85 per cent by weight of an alkyl vinyl ketone, wherein the carbon of the carbonyl radical is directly joined to the vinyl radical and the alkyl radical, said alkyl radical containing from 1 to 4 carbon atoms, and from 40 to 15 per cent by weight of a nitrile from the group consisting of acrylonitrile and methacrylonitrile in the presence of a peroxide catalyst at a temperature from 20° C. to 120° C., and preventing formation of mutually incompatible polymers and copolymers by limiting the relative proportions of nitrile monomer entering the polymerization reaction to less than 40 per cent by weight to prevent formation of a second polymer phase, said nitrile monomer having a slower rate of reaction than the ketone monomer.

9. A process which comprises copolymerizing a mixture of monomers consisting of from 60 to 85 per cent by weight of an alkyl vinyl ketone wherein the carbon of the carbonyl radical is directly joined to the vinyl radical and the alkyl radical, said alkyl radical containing from 1 to 4 carbon atoms, and from 40 to 15 per cent by weight of acrylonitrile in the presence of a peroxide catalyst at a temperature from 20° C. to 120° C., and preventing formation of mutually incompatible polymers and copolymers by limiting the relative proportions of acrylonitrile monomer entering the polymerization reaction to less than 40 per cent by weight to prevent formation of a second polymer phase, said nitrile monomer having a slower rate of reaction than the ketone monomer.

10. A process which comprises copolymerizing a mixture of monomers consisting of from 60 to 85 per cent by weight of methyl vinyl ketone and from 40 to 15 per cent by weight of acrylonitrile at a temperature from 20° C. to 120° C., and preventing formation of mutually incompatible polymers and copolymers by limiting the relative proportion of acrylonitrile entering the polymerization reaction to prevent formation of a second polymer phase, said acrylonitrile having a slower rate of reaction than methyl vinyl ketone.

11. A process which comprises copolymerizing a mixture of monomers consisting of from 60 to 85 percent by weight of methyl vinyl ketone and from 40 to 15 per cent by weight of acrylonitrile in the presence of a peroxide catalyst at a temperature from 20° C. to 120° C., and preventing formation of mutually incompatible polymers and copolymers by limiting the relative proportions of acrylonitrile monomer entering the polymerization reaction to less than 40 per cent by weight to prevent formation of a second polymer phase, said acrylonitrile having a slower rate of reaction than methyl vinyl ketone.

WILLIAM E. ELWELL.
RICHARD L. MEIER.

REFERENCES CITED

The following references are of record in the file of this patent:

UNITED STATES PATENTS

| Number | Name | Date |
|---|---|---|
| 2,100,900 | Fikentscher | Nov. 30, 1937 |
| 2,326,095 | D'Ianni | Aug. 3, 1943 |
| 2,326,736 | Adelson | Aug. 17, 1943 |
| 2,356,767 | Kropa | Aug. 29, 1944 |
| 2,385,695 | Dreisbach | Sept. 25, 1945 |

FOREIGN PATENTS

| Number | Country | Date |
|---|---|---|
| 842,816 | France | Mar. 13, 1939 |

OTHER REFERENCES

India Rubber World, April 1944, page 79.